United States Patent
Mabuchi et al.

(10) Patent No.: US 8,318,332 B2
(45) Date of Patent: Nov. 27, 2012

(54) MAGNETIC RECORDING MEDIUM, METHOD FOR FABRICATING THE SAME, AND MAGNETIC STORAGE DEVICE

(75) Inventors: Katsumi Mabuchi, Hitachi (JP); Haruo Akahoshi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 45 days.

(21) Appl. No.: 12/819,661

(22) Filed: Jun. 21, 2010

(65) Prior Publication Data

US 2010/0323223 A1  Dec. 23, 2010

(30) Foreign Application Priority Data

Jun. 22, 2009  (JP) ................... 2009-148067

(51) Int. Cl.
    G11B 5/66  (2006.01)
(52) U.S. Cl. ........................................ 428/836
(58) Field of Classification Search ............ None
    See application file for complete search history.

(56) References Cited

U.S. PATENT DOCUMENTS

| | | | | |
|---|---|---|---|---|
| 5,958,544 A | * | 9/1999 | Usuki | 428/832.4 |
| 6,665,145 B2 | * | 12/2003 | Wada | 360/133 |
| 2002/0135939 A1 | | 9/2002 | Wada | |
| 2006/0183004 A1 | | 8/2006 | Hattori et al. | |
| 2007/0059562 A1 | | 3/2007 | Hattori et al. | |
| 2007/0153419 A1 | | 7/2007 | Arai et al. | |

FOREIGN PATENT DOCUMENTS

| | | |
|---|---|---|
| JP | 2-79211 | 3/1990 |
| JP | 5-159272 | 6/1993 |
| JP | 5-274665 | 10/1993 |
| JP | 07-085406 | 3/1995 |
| JP | 10-208228 | 8/1998 |
| JP | 3286291 | 3/2002 |
| JP | 2006-85899 | 3/2006 |
| JP | 2006-120222 | 5/2006 |
| JP | 2006-228282 | 8/2006 |
| JP | 2007-184019 | 7/2007 |

OTHER PUBLICATIONS

Office Action issued in Japanese Patent Application No. 2009-148067 on May 8, 2012.
Office Action issued in Japanese Patent Application No. 2009-148067 on Aug. 28, 2012.

* cited by examiner

Primary Examiner — Holly Rickman
(74) Attorney, Agent, or Firm — Antonelli, Terry, Stout & Kraus, LLP.

(57) ABSTRACT

A discrete track medium and a patterned medium that are excellent in both magnetic recording properties and corrosion resistance are realized. The medium has a magnetic recording layer, which includes a magnetic region formed in a projection portion of a projection/recess pattern over a substrate and a filler region embedded in a recess portion of the projection/recess pattern, and an organic compound, which exhibits corrosion inhibition action for cobalt or cobalt alloys, between the magnetic region and the filler region.

10 Claims, 5 Drawing Sheets

MAGNETIC RECORDING MEDIUM, METHOD FOR FABRICATING THE SAME, AND MAGNETIC STORAGE DEVICE

BACKGROUND OF THE INVENTION

1. Field of the Invention

The present invention relates to a magnetic recording medium, a method for fabricating the same, and a magnetic storage device having such a magnetic recording medium. In particular, the invention relates to a patterned medium, a magnetic recording medium, and a magnetic storage device with such a magnetic recording medium that are suited to high-density recording.

2. Background Art

In recent years, there has been increasing demand for increased capacity and improved recording density of magnetic storage devices as can be seen in the recent trend that not only personal computers but other household electric appliances have also been mounted with compact, high-capacity magnetic disk devices. In order to cope with such demand, magnetic heads, magnetic recording media, and the like have been intensively developed. So far, an improvement in the areal recording density has been attempted, but nowadays, downsizing and further drastic improvement in the recording density are demanded.

Thus, there have been proposed a discrete track medium in which adjacent recording tracks are separated with a groove or a nonmagnetic material therebetween so that magnetic interference between the tracks is suppressed (for example, see Reference 1: JP Patent Publication (Kokai) No. H07-85406 A (FIG. 1)) and a patterned medium in which adjacent recording bits are separated with a groove or a nonmagnetic material therebetween so that magnetic interference between the bits is suppressed (for example, see Reference 2: JP Patent No. 3286291 B (paragraph No. [0025])).

For magnetic recording media, the planarity of the surface is considered to be very important to ensure the levitation stability of the magnetic head. When discrete track media or patterned media with high areal recording density and small magnetic domains are used, a groove between adjacent magnetic regions is filled with a nonmagnetic material as the planarity of the surface is of particular importance.

Further, discrete media and patterned media are typically provided with a protective film made of carbon-based materials above the recording layer for protection of the recording layer and adsorption of lubricant as with the conventional recording media.

Among carbon-based materials, diamond-like carbon (hereinafter also referred to as DLC) is used for the aforementioned protective film because, being amorphous, it exhibits excellent surface planarity, durability, and corrosion resistance (for example, see Reference 3: JP Patent Publication (Kokai) No. 2006-120222 A (paragraph No. [0025]))

Meanwhile, as a problem that hinders the improvement in the reliability of discrete track media and patterned media, there is a problem of corrosion due to damage caused by the process of forming projections/recesses in a magnetic film by dry-etching or the like, or corrosion due to defects or a minute gap between a magnetic region and a nonmagnetic region of the recording layer.

As an example of the conventional techniques for improving the corrosion resistance, there has been proposed a technique for improving the corrosion resistance of a soft magnetic underlayer, the corrosion of which is of the biggest concern, of a perpendicular magnetic recording medium by selecting an appropriate combination of the materials and structure of a seed layer that is provided on the soft magnetic underlayer (for example, see Reference 4: JP Patent Publication (Kokai) No. 2007-184019 A (FIG. 1)).

Further, for discrete track media and patterned media, there has also been proposed a technique for inhibiting corrosion of a magnetic region by forming a conductive film between a recording layer and a protective film (for example, see Reference 5: JP Patent Publication (Kokai) No. 2006-228282 A (paragraph No. [0051])).

SUMMARY OF THE INVENTION

However, when a protective film is formed on the magnetic region in order to inhibit corrosion of the magnetic region, the magnetic distance between the magnetic head and the magnetic recording medium could increase, and thereby degrading the magnetic recording properties. Meanwhile, if the thickness of the protective film is reduced to improve the magnetic recording properties, it would be difficult to obtain satisfactory results of the product performance in terms of the corrosion resistance.

That is, it has been found difficult to achieve both high magnetic recording properties and high corrosion resistance with the conventionally-known techniques for inhibiting corrosion of a magnetic region of a magnetic recording layer.

The present invention has been made in order to solve the aforementioned problems. It is an object of the present invention to realize a discrete track medium and a patterned medium that are excellent in both magnetic recording properties and corrosion resistance.

A magnetic recording medium in accordance with the present invention has a magnetic recording layer, which includes a magnetic region formed in a projection portion of a projection/recess pattern over a substrate and a filler region embedded in a recess portion of the projection/recess pattern, and a layer made of an organic compound, which exhibits corrosion inhibition action for cobalt or cobalt alloys, between the magnetic region and the filler region.

According to the magnetic recording medium of the present invention, corrosion inhibition effects can be exerted between the magnetic region and the filler region of the magnetic recording layer, whereby a magnetic recording medium with excellent corrosion resistance can be provided.

DESCRIPTION OF SYMBOLS

Figure 1:
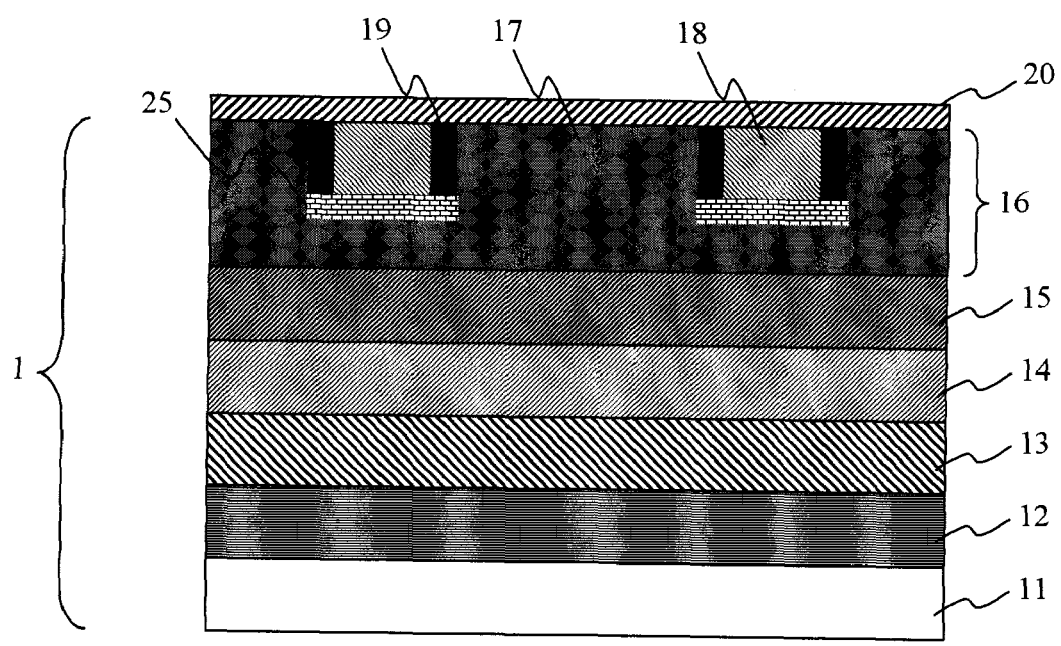
FIG. 1 is a cross-sectional structural view of a magnetic recording medium 1 in accordance with Embodiment 1.

| DESCRIPTION OF SYMBOLS | |
|---|---|
| 1 | magnetic recording medium |
| 11 | substrate |
| 12 | adhesive layer |
| 13 | soft magnetic underlayer |
| 14 | seed layer |
| 15 | intermediate layer |
| 16 | magnetic recording layer |
| 17 | magnetic region |
| 18 | nonmagnetic region |
| 19 | organic layer |
| 20 | protective film A |
| 21 | resist |
| 22 | transfer apparatus |
| 23 | lubricant layer |
| 24 | protective film C |
| 25 | protective film B |
| 30 | patterned medium |
| 31 | magnetic head |
| 32 | read/write portion |
| 33 | magnetic head driving portion |
| 34 | patterned medium driving portion |

DETAILED DESCRIPTION OF THE PREFERRED EMBODIMENTS

First, prior to the description of the embodiments of the present invention, properties required for an organic layer that is provided on a magnetic region of a magnetic recording layer will be described as a feature that is common to all embodiments.

Materials whose corrosion is of the biggest concern in a magnetic recording layer of a magnetic recording medium are Co alloys used in a magnetic region. Co alloys not only have poor corrosion resistance but also have very low electric potentials in an aqueous solution environment. Thus, galvanic corrosion (dissimilar metal corrosion) can occur between such alloys and neighboring metals.

When a granular magnetic recording layer is used, a Ru layer, a Ru-alloy layer, or the like is formed below the magnetic recording layer to promote segregation of oxide to the grain boundaries of the magnetic recoding layer.

In a recess portion that is the processed portion of the magnetic recording layer, if the Ru layer or the Ru-alloy layer becomes exposed to a contact portion between such layer and the magnetic recording layer due to damage caused by the processing, the Co alloy in the magnetic recording layer would undergo galvanic corrosion. This is because Ru or Ru alloys, which are noble metals, have very high electric potentials. Such galvanic corrosion can proceed more rapidly than when a single metal material would corrode.

Meanwhile, as for discrete track media and patterned media, when projections/recesses are formed in a magnetic recording layer by dry-etching or the like, damage can occur due to the etching, which is problematic in that corrosion can accelerate at the interface of the magnetic region.

The inventors have found that, in order to inhibit the aforementioned corrosion of the magnetic region, it is effective to provide a layer made of an organic compound, which exhibits corrosion inhibition action for cobalt or cobalt alloys, on the processed part of the magnetic region of the magnetic recording layer. Accordingly, it becomes possible to inhibit corrosion caused by the contact between dissimilar metals or corrosion due to damage caused by the processing. In such a case, however, the properties of the selected organic compound are important.

In view of inhibiting corrosion, the properties of the organic layer provided on the processed part of the magnetic region of the magnetic recording layer should satisfy the following (Requirement 1) to (Requirement 3).

(Requirement 1) Exhibit corrosion inhibition action for cobalt or cobalt alloys.

(Requirement 2) Be made of a dense, smooth film with as few defects as possible.

(Requirement 3) Have a structure such that the magnetic recording properties would not degrade with an increase in the magnetic distance between the magnetic head and the magnetic recording medium.

Other than the properties of the organic layer, it would also be necessary that the organic layer be formed such that it does not influence the magnetic region.

Corrosion environment is basically a water-based environment. However, as there is a variety of factors that could cause corrosion such as acidification or alkalization due to decomposition of lubricant or mixing of chloride, it is demanded that the corrosion resistance to a wide range of pH environments be provided.

A portion whose corrosion is of particular concern is the boundary portion between the magnetic region and the nonmagnetic region of the magnetic recording layer. As such a portion is considered to form a crevice, if corrosion (crevice corrosion) occurs in that portion, the environment becomes acidified. Therefore, it is demanded that the corrosion resistance in such an acid region, in particular, be provided.

With respect to the aforementioned (Requirement 1), the inventors have conducted concentrated studies and found that corrosion of Co or Co alloys can be inhibited by forming an organic compound layer with a heterocyclic ring typified by benzotriazole (BTA) or an organic layer made of a self-assembled film typified by alkanethiol.

When an organic compound layer with a heterocyclic ring typified by benzotriazole is used, the corrosion resistance is considered to be improved because hetero atoms in the heterocyclic ring bind strongly to Co in the recording layer, and also because the benzotriazole molecules form a network.

Meanwhile, when a self-assembled film typified by alkanethiol is used, for example, alkanethiol molecules strongly adsorb or bind onto Co or Co alloys, thereby ion-exchange adsorbing or binding to the previously adsorbed $H_2O$ or $O_2$ which are substances that would start corrosion. Thus, as the $H_2O$ or $O_2$ is removed from the surface, the corrosion resistance is considered to be improved.

The aforementioned (Requirement 2) is presumably achieved as follows. The surface of the Co or Co alloy material necessarily has formed thereon a thin natural Co oxide film with a thickness on the order of atomic dimensions. When a compound layer with a heterocyclic ring such as BTA is used, the BTA molecules form strong coordinate bonds with the Co oxide, and also the BTA molecules together form covalent bonds, whereby a rigid BTA polymer film is formed on the surface of Co or Co alloy. Therefore, a very dense, defect-free film with a high adhesion property is formed.

When a self-assembled film typified by alkanethiol is used, the monomolecular is orderly arranged at a constant angle, and also form chelate bonds with the Co or Co alloy material. Accordingly, a dense, highly adhesive film with few defects is produced. Through such self assembly, S atoms are arranged on the side of the Co or Co alloy material, whereas alkyl chains are arranged on the opposite side thereof. Thus, a large contact angle as well as a water-repellent function are provided.

With respect to the aforementioned (Requirement 3), metal to be passivated, its alloy, or a carbon layer is provided on the magnetic recording layer in the plane direction (a portion to be read and written by the head) in the process of fabricating a magnetic recording medium, and thereafter, such metal, alloy, or carbon layer is removed as described below. Therefore, the aforementioned problem can be avoided.

Even if the film of a heterocyclic compound typified by BTA or the self-assembled film typified by alkanethiol remains on the magnetic recording layer, the magnetic recording properties will not degrade as the produced film is a monolayer or a film close to it, and thus is very thin. Described above are the properties required for the organic layer provided on the magnetic region of the magnetic recording layer.

Next, embodiments of the present invention will be described.

Embodiment 1

FIG. 1 is a cross-sectional structural view of a magnetic recording medium 1 in accordance with Embodiment 1 of the present invention.

The magnetic recording medium 1 in accordance with Embodiment 1 has a glass disk substrate 11 as a substrate, and has sequentially formed thereon an adhesive layer 12, a soft magnetic underlayer 13, a seed layer 14, an intermediate layer 15, and a magnetic recording layer 16.

The magnetic recording layer 16 has a projection/recess pattern. The projection portion corresponds to a magnetic region 17 and the recess portion corresponds to a nonmagnetic region 18.

A protective film B25 is formed at the bottom of the recess portion. Formed at the interface between the magnetic region 17 and the nonmagnetic region 18 is an organic layer 19 made of an organic compound that exhibits corrosion inhibition action for cobalt or cobalt alloys.

A protective film A20 is formed on the magnetic recording layer 16. Though not shown, lubricant is applied onto the protective film A20.

The material of the adhesive layer 12 is not particularly limited as long as such material exhibits excellent adhesion to the substrate and excellent surface planarity. However, the adhesive layer 12 is preferably formed from an alloy containing at least two metals selected from the group consisting of Ni, Al, Ti, Ta, Cr, Zr, Co, Hf, Si, and B. More specifically, NiTa, AlTi, AlTa, CrTi, CoTi, NiTaZr, NiCrZr, CrTiAl, CrTiTa, CoTiNi, CoTiAl, or the like can be used.

The material of the soft magnetic underlayer 13 is not particularly limited either as long as such material has a saturation magnetic flux density (Bs) of at least 1 tesla, imparts uniaxial anisotropy in the radial direction of the disk substrate 11, and exhibits a coercivity of less than or equal to 1.6 kA/m when measured in the head dunning direction as well as excellent surface planarity.

Specifically, the aforementioned properties can easily be obtained when an amorphous alloy containing Co, Ni, or Fe as the main component, and to which Ta, Hf, Nb, Zr, Si, B, C, or the like is added, is used.

Further, if a stacked structure in which a nonmagnetic layer is inserted in the soft magnetic underlayer 13 is used, noise can be reduced. As the material of such nonmagnetic layer, a CoCr alloy, Ru, Cr, Cu, MgO, or the like is desirably used.

The seed layer 14 has a function of controlling the orientation and grain size of the intermediate layer 15. For the seed layer 14, a fcc alloy containing Ni as the main component can be used, for example. Typically, an alloy containing Ni and at least one metal selected from the group consisting of W, Fe, Ta, Ti, Nb, Cr, Mo, V, and Cu can be used.

In order to improve the corrosion resistance, the seed layer can also be formed in two layers. In such a case, one of the two seed layers that is closer to the magnetic recording layer 16 can be used as the seed layer 14 (a second seed layer), and an alloy in which Ta, Ti, Nb, or Al is added to Cr can be inserted as a first seed layer between the second seed layer and the soft magnetic underlayer 13.

For the intermediate layer 15, Ru can be used alone or an alloy containing Ru as the main component and having a hexagonal close-packed lattice (hcp) structure or fcc structure can be used.

It should be noted that even when a material with a composition other than the aforementioned composition is used for the intermediate layer 15, the organic layer 19 will exert an effect similar to that of the present invention if a material with a composition that will easily cause galvanic corrosion with Co or Co alloys is used for the intermediate layer 15.

As the material of the magnetic region 17 formed in the projection portion of the magnetic recording layer 16, it is possible to use a glanular alloy containing a CoCr-based alloy such as a CoCrPt alloy, a FePt-based alloy, or the like as the main component, and to which oxide such as $SiO_2$ is added. Specifically, CoCrPt—$SiO_2$, CoCrPt—MgO, CoCrPt—TaO, or the like can be used.

As the material of the nonmagnetic region 18 formed in the recess portion, it is possible to use oxide such as $SiO_2$, $Al_2O_3$, $TiO_2$, or ferrite, nitride such as AlN, or carbide such as SiC. The Co concentration is preferably 15 to 25 at % (atomic percent), and the Pt concentration is preferably 10 to 20 at %.

The protective film B25 formed at the bottom of the recess portion of the magnetic region 17 is a layer provided with a view to suppress defects due to damage caused in processing the magnetic region 17. The protective film B25 is made of metal to be passivated, its alloy, or a carbon layer.

As the metal to be passivated, it is possible to use Cr, Ti, Ni, Mo, Nb, W, Ta, or Zr, or an alloy containing at least one of such metals. In particular, an alloy containing Cr is desirably used.

The organic layer 19 formed at the interface between the magnetic region 17 and the nonmagnetic region 18 should exhibit corrosion inhibition action for cobalt or cobalt alloys. Although a heterocyclic compound typified by BTA or a self-assembled film typified by alkanethiol is effective for the organic layer 19, the material of the organic layer 19 is not limited thereto.

A heterocyclic compound is a compound with a heterocyclic ring including hetero atoms. For the hetero atoms, nitrogen atoms, sulfur atoms, oxygen atoms, selenium atoms, tellurium atoms, phosphorus atoms, boron atoms, or the like are preferably used. Most preferably, nitrogen atoms, sulfur atoms, or oxygen atoms are used. Although the number of hetero atoms included in the heterocyclic compound are not limited, a heterocyclic compound with two or more hetero atoms will exhibit high corrosion resistance.

Specific examples of heterocyclic rings include, but are not limited to, benzotriazole rings, benzothiazole rings, benzimidazole rings, triazole rings, imidazole rings, pyridine rings, quinoline rings, and triazole rings. Besides, thiadiazoles can also be used.

Further, compounds with substituents can also be effectively used. Examples of substituents include alkyl groups, sulfo groups, and carboxyl groups. Specific examples of such compounds include, but are not limited to, benzotriazole, 1,2,3-triazole, 1,2,3,4-tetrazole, 3-Amino-1,2,4-triazole, nitro-1H-benzotriazole, carboxybenzotriazole, 5-methylbenzotriazole, and uric acids.

Examples of methods for forming the organic layer 19 using a heterocyclic compound include immersing the magnetic region 17 in an aqueous solution or an organic solvent that contains the aforementioned heterocyclic ring for a given period of time, and spraying such aqueous solution or organic solvent to the magnetic region 17.

It should be noted that a compound that does not include a heterocyclic ring but includes N, S, O, or the like having an unpaired electron with an adsorption function, such as amine, is also an effective material for the organic layer 19.

Examples of self-assembling organic compounds include alkanethiol having a thiol group as an anchor group. The structure of alkanethiol is represented by R(CH$_2$)nSH.

In the aforementioned formula, R includes methyl (—CH$_3$), amino (—NH$_2$), carboxy (—COOH), carboxylate (—COO—), hydroxyl (—OH), amide (—CONH$_2$), and the like. In addition, n indicates the number of carbon atoms in the alkane chain.

Typical examples of self-assembling organic compounds include 1-octadecanethiol. Other than alkanethiol, materials having a hydroxamic acid group as an anchor group can also be used. Among such materials is a compound with hydrophobic properties such as an alkyl group that inhibits the approach of corrosive ions. Examples include n-dodecanehydroxamic acid.

Examples of methods for forming the aforementioned self-assembled film at the interface between the magnetic region 17 and the nonmagnetic region 18 include, as described below, immersing the magnetic region 17 and the nonmagnetic region 18 in a solution in which the aforementioned material is dissolved in a solvent for a given period of time, and spraying such a solution to the magnetic region 17. Examples of the solvent used include, but are not limited to, alcohols, ketones, ethers, and amides.

Besides, it is also possible to use a method for further increasing the corrosion resistance by elongating the alkyl chains of the alkanethiol molecules of the self-assembled film through chemical modification and polymerizing the adjacent molecules in one dimension.

For example, it would be effective, after forming a self-assembled film by immersing the magnetic region 17 and the nonmagnetic region 18 in 11-mercapto-1-undecanol, to react the obtained film with alkyltrichlorosilane so as to form a one-dimensional film in which the molecules are horizontally bonded with Si—O—Si bonds. Further, it is also possible to use a method for forming a self-assembled film with a Si—O—Si cross-linked structure in two directions by reacting the film with tetrachlorosilane to undergo hydrolysis and further reacting the film with alkyltrichlorosilane.

As the material of the protective film A20 formed on the magnetic recording layer 16, a hard carbon film typified by a diamond-like carbon film, for example, is used. Further, a lubricant layer is formed on the protective film A20 though not shown in FIG. 1. For the lubricant layer, PFPE (perfluoropolyether) or Fomblin-based lubricant can be used. Described above is the structure of the magnetic recording medium 1 in accordance with Embodiment 1.

As described above, in Embodiment 1, the organic layer 19 made of an organic compound that exhibits corrosion inhibition action for cobalt or cobalt alloys is provided at the interface between the magnetic region 17 and the nonmagnetic region 18 of the magnetic recording layer 16. Accordingly, the corrosion resistance of the magnetic recording medium 1 can be improved.

It should be noted that in Embodiment 1, the organic layer 19 can be formed only at part of the interface between the magnetic region 17 and the nonmagnetic region 18. In such a case, the effect of increasing the corrosion resistance can be similarly achieved at the portion where the organic layer 19 is formed.

In other words, the magnetic region 17 is at least partially in contact with or binds to the nonmagnetic region 18 with the organic layer 19 interposed therebetween. Accordingly, it can be said that the corrosion resistance of the magnetic recording medium 1 is increased.

Embodiment 2

Embodiment 2 of the present invention will describe an example of a method for fabricating the magnetic recording medium 1 described in Embodiment 1.

The magnetic recording medium 1 in accordance with the present invention can be fabricated using a sputtering system fabricated by ANELVA (C3010), for example. Such a sputtering system includes ten process chambers and a single substrate introduction chamber, and each chamber is evacuated individually. The evacuation ability of each chamber is less than or equal to $6 \times 10^{-6}$ Pa.

FIGS. 2A to 2L are views illustrating the method for fabricating the magnetic recording medium 1 in accordance with Embodiment 2. Hereinafter, steps shown in FIGS. 2A to 2L will be described.

Figure 2A:
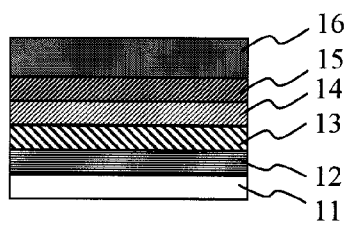
FIGS. 2A to 2L are views illustrating a method for fabricating a magnetic recording medium 1 in accordance with Embodiment 2.

(Step 1): FIG. 2A

A glass substrate with a diameter of 63.5 mm was used for the glass substrate 11. Then, the adhesive layer 12, the soft magnetic underlayer 13, the seed layer 14, the intermediate layer 15, and a portion corresponding to the magnetic region 17 of the magnetic recording layer 16 were sequentially formed on the glass substrate 11 by sputtering.

Table 1 shows the composition and thickness of each representative layer. It should be noted that a composition whose subscripts total 100 in Table 1 indicates the composition of an alloy (atomic percent).

The composition and thickness shown in Table 1 are only typical examples. Thus, similar results can be obtained even when a composition and thickness other those shown in Table 1 are used.

For example, similar results can be obtained even when any of the following structures is used: (1) $Cr_{50}Ti_{50}$ and $Ni_{90}Ti_{10}$ are used for the first seed layer and the second seed layer, respectively, (2) not two layers but a single NiWTa layer or the like is used for the seed layer 14, and (3) CoCrPt—TaO is used for the magnetic recording layer 16.

TABLE 1

| | | Target Composition (at %) | Thickness (nm) |
|---|---|---|---|
| Adhesive Layer 12 | | $Ni_{63}Ta_{37}$ | 10 |
| Soft Magnetic Underlayer 13 | First Soft Magnetic Layer | $Co_{92}Ta_3Zr_5$ | 50 |
| | Nonmagnetic Layer | Ru | 0.8 |
| | Second Soft Magnetic Layer | $Co_{92}Ta_3Zr_5$ | 50 |
| Seed Layer 14 | First Seed Layer | $Ta_{70}Cr_{30}$ | 2 |
| | Second Seed Layer | $Ni_{92}W_8$ | 5 |
| Intermediate Layer 15 | | Ru | 16 |
| Magnetic Recording Layer 16 | | $CoCrPt—SiO_2$ | 16 (The Thickest Portion) |

Figure 2B:
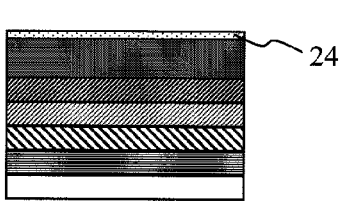

(Step 2): FIG. 2B

A protective film C24 is formed on a portion corresponding to the magnetic region 17 of the magnetic recording layer 16. This protective film C24 is formed in order to prevent corrosion of the magnetic region 17 in the subsequent step of forming a discrete track by applying resist 21.

Figure 2C:
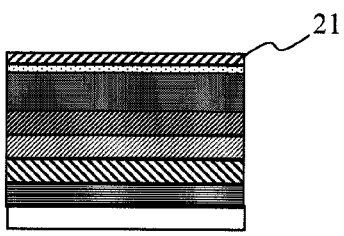

(Step 3): FIG. 2C

The resist 21 is applied onto the protective film C24 by spin coating or the like.

Figure 2D:
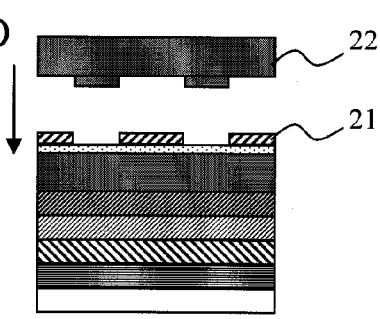

(Step 4): FIG. 2D

A projection/recess pattern with a predetermined interval therebetween, which corresponds a servo pattern in a servo region and a track pattern in a data region, is transferred to the layer of the resist 21 by nanoimprinting using a transfer apparatus 22.

Figure 2E:
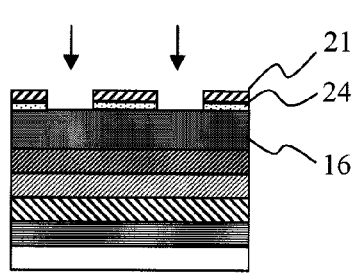

(Step 5): FIG. 2E

A portion of the protective film C24 in a position corresponding to the partially removed resist 21 is removed by reactive ion beam etching.

Figure 2F:
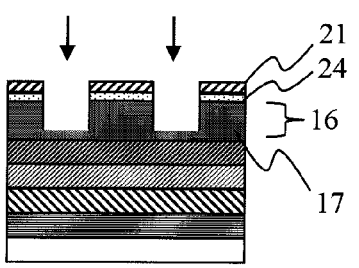

(Step 6): FIG. 2F

A portion of the magnetic region 17 of the magnetic recording layer 16 in a position corresponding to the partially removed protective film C24 is removed by ion milling, whereby recess portions are formed.

Figure 2G:
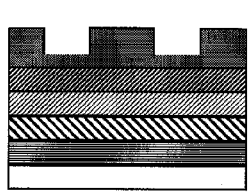

(Step 7): FIG. 2G

The protective film C24 and the resist 21 are removed.

Figure 2H:
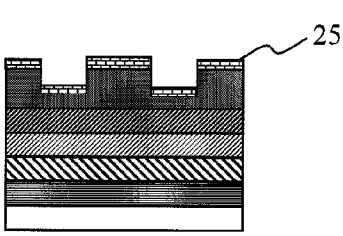

(Step 8): FIG. 2H

The protective film B25 is formed on the magnetic recording layer 16 by sputtering using metal to be passivated, its alloy, a carbon film, or the like.

Figure 2I:
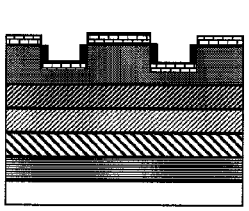

(Step 9): FIG. 2I

The organic layer 19 is formed on a region of the magnetic region 17 of the magnetic recording layer 16 in which the protective film B25 is not sufficiently formed, that is, a portion along the longitudinal direction of the interface between the magnetic region 17 and the nonmagnetic region 18 in FIG. 2I.

Figure 2J:
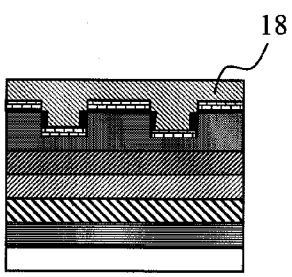

(Step 10): FIG. 2J

A filler region is formed by filling the recess portion of the magnetic recording layer 16 with a filler made of a nonmagnetic material by sputtering such that the thickness of the filler region is slightly thicker than that of the recess portion. Such a nonmagnetic material will form the nonmagnetic region 18 of the magnetic recording layer 16.

Figure 2K:
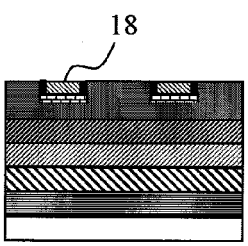

(Step 11): FIG. 2K

A redundant portion, which will not form the nonmagnetic region 18, of the filler filling the recess portion in FIG. 2J, and a portion of the protective film B25 located on the magnetic region 17 of the magnetic recording layer 16 are removed by etching, for example, CMP (Chemical Mechanical Planarization). Accordingly, irregularities of the surface of the magnetic recording medium 1 that have been generated in the steps of FIG. 2D to FIG. 2J can be smoothed.

Figure 2L:
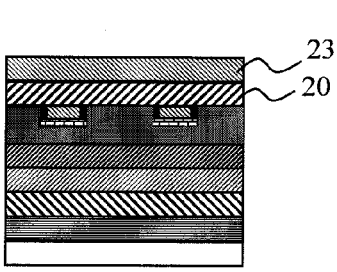

(Step 12): FIG. 2L

The protective film A20 is deposited on the surface smoothed in FIG. 2K by CVD (Chemical Vapor Deposition). Next, a liquid lubricant layer 23 is applied onto the protective film A20.

Described above is an example of the method for fabricating the magnetic recording medium 1 described in Embodiment 1. It should be noted that evaluation of the corrosion resistance of the magnetic recording medium 1 described in Embodiments 1 and 2 will be described later in the subsequent embodiment.

As described above, according to Embodiment 2, the organic layer 19 is formed by immersing the magnetic region 17 in a solution in which an organic compound that exhibits corrosion inhibition action for cobalt or cobalt alloys is dissolved in a solvent, or spraying such a solution to the magnetic region 17. Such an organic layer 19 is formed in a portion corresponding to the interface between the magnetic region 17 and the nonmagnetic region 18. Accordingly, the corrosion resistance of the magnetic recording medium 1 can be improved.

In addition, in the step shown in FIG. 2H of Embodiment 2, the protective film B25 made of metal to be passivated or carbon is formed at the top and bottom of the projection/recess pattern of the magnetic recording layer 16. Accordingly, defects due to damage caused by the processing of the magnetic region 17 can be recovered.

Embodiment 3

Embodiment 3 of the present invention will describe a method for fabricating the magnetic recording medium 1, which differs from that in Embodiment 2.

FIGS. 3A to 3K are views illustrating the method for fabricating the magnetic recording medium 1 in accordance with Embodiment 3. Hereinafter, steps shown in FIGS. 3 to 3K will be described.

(Step 1) to (Step 6): FIG. 3A to FIG. 3F

Figure 3A:
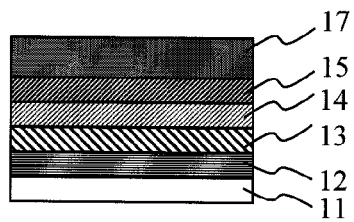
FIGS. 3A to 3K are views illustrating a method for fabricating a magnetic recording medium 1 in accordance with Embodiment 3.
Figure 3G:
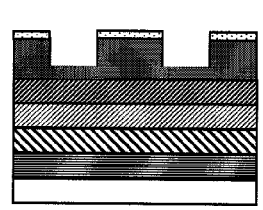
Figure 3B:
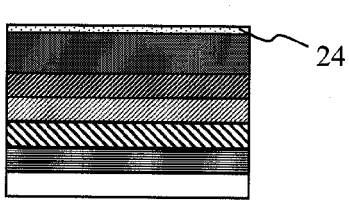
Figure 3H:
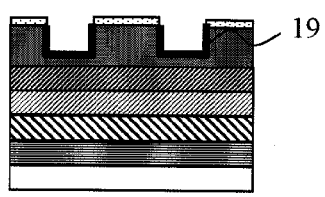
Figure 3C:
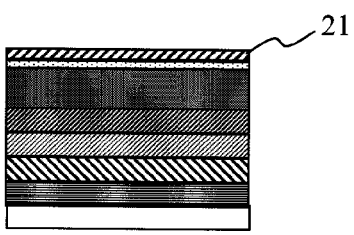
Figure 3I:
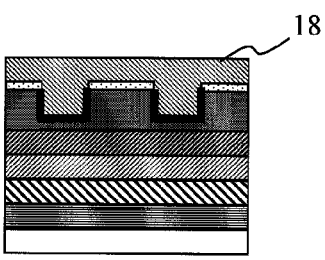
Figure 3D:
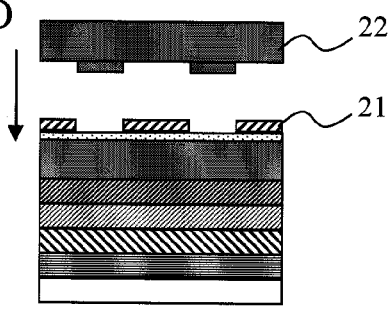
Figure 3J:
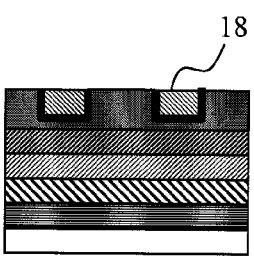
Figure 3E:
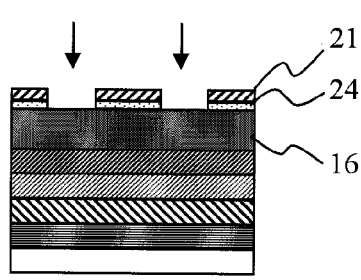
Figure 3K:
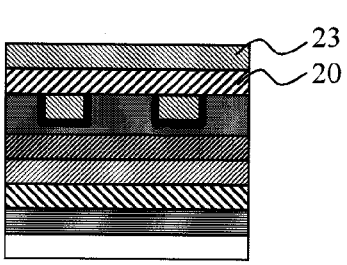
Figure 3F:
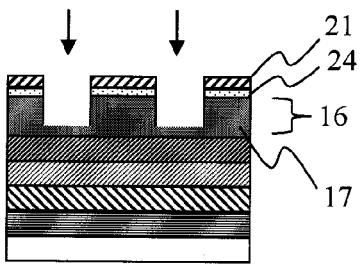

The steps up to FIG. 3F are the same as those up to FIG. 2F in Embodiment 2.

(Step 7): FIG. 3G

The resist 21 is removed. FIG. 3G differs from FIG. 2G in that the protective film C24 is not removed whereas it is removed in FIG. 2G.

(Step 8): FIG. 3H

The organic layer 19 is formed in a portion along the longitudinal direction of the interface between the magnetic region 17 and the nonmagnetic region 18 in the same procedure as that in FIG. 2I.

(Step 9) to (Step 11): FIG. 3I to FIG. 3K

These steps are the same as those in FIG. 2J to FIG. 2L.

Described above is the method for fabricating the magnetic recording medium 1 in accordance with Embodiment 3. As can be seen from comparison between FIG. 3K and FIG. 2L, when the magnetic recording medium 1 is fabricated with the fabrication method in accordance with Embodiment 3, a difference arises in terms of whether metal to be passivated, its alloy, or a carbon layer (the protective film B25) is provided at the bottom of the recess portion of the magnetic region 17 or not. It should be noted that evaluation of the corrosion resistance of the magnetic recording medium 1 described in Embodiment 3 will be described later in the subsequent embodiment.

As described above, in Embodiment 3, the organic layer 19 is formed in a portion corresponding to the interface between the magnetic region 17 and the nonmagnetic region 18 as in Embodiment 2. Accordingly, the corrosion resistance of the magnetic recording medium 1 can be increased.

Embodiment 4

Embodiment 4 of the present invention will describe a method for fabricating the magnetic recording medium 1, which differs from those in Embodiments 2 and 3.

Figure 4A:
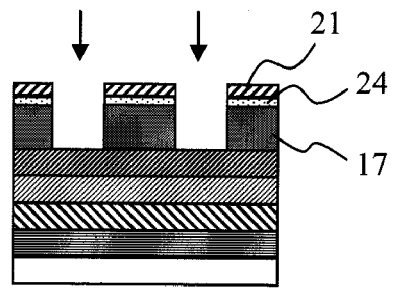
FIGS. 4A and 4B are views illustrating part of a method for fabricating a magnetic recording medium 1 in accordance with Embodiment 4.
Figure 4B:
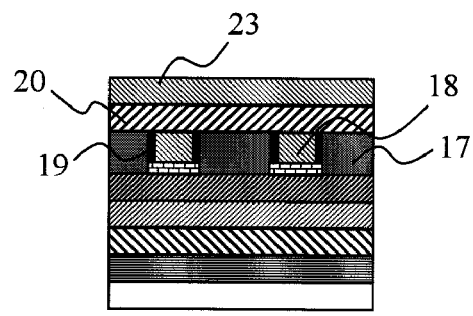

FIGS. 4A and 4B are views illustrating part of a method for fabricating the magnetic recording medium 1 in accordance with Embodiment 4. Hereinafter, steps shown in FIGS. 4A and 4B will be described. In Embodiment 4, the whole part of the magnetic recording layer 16 at the bottom of the recess portion is removed in the step of forming a projection/recess pattern in the magnetic region 17 of the magnetic recording layer 16, so that the intermediate layer 15 is exposed. Such a process corresponds to removal of the magnetic region 17 in the step of FIG. 2F to such an extent that the intermediate layer 15 is exposed.

FIG. 4A is a cross-sectional structural view showing a state in which the aforementioned step is executed in Embodiment 4. FIG. 4A differs from FIG. 2F in that the intermediate layer 15 is exposed at the bottom of the magnetic recording layer 16. The fabrication steps following the step of FIG. 4A are the same as those described in Embodiment 2.

FIG. 4B is a cross-sectional structural view of the magnetic recording medium 1 obtained by executing the fabrication method of Embodiment 4.

Described above is the method for fabricating the magnetic recording medium 1 in accordance with Embodiment 4. It should be noted that evaluation of the corrosion resistance of the magnetic recording medium 1 described in Embodiment 4 will be described later in the subsequent embodiment.

As described above, in Embodiment 4, the organic layer 19 is formed in a portion corresponding to the interface between the magnetic region 17 and the nonmagnetic region 18 as in Embodiments 2 and 3. Accordingly, the corrosion resistance of the magnetic recording medium 1 can be improved.

Embodiment 5

Figure 5:
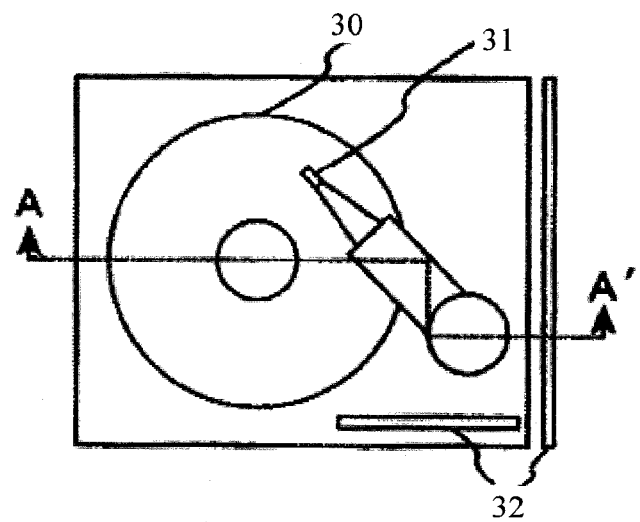
FIG. 5 is a schematic structural view of a magnetic storage device in accordance with Embodiment 5.
Figure 6:
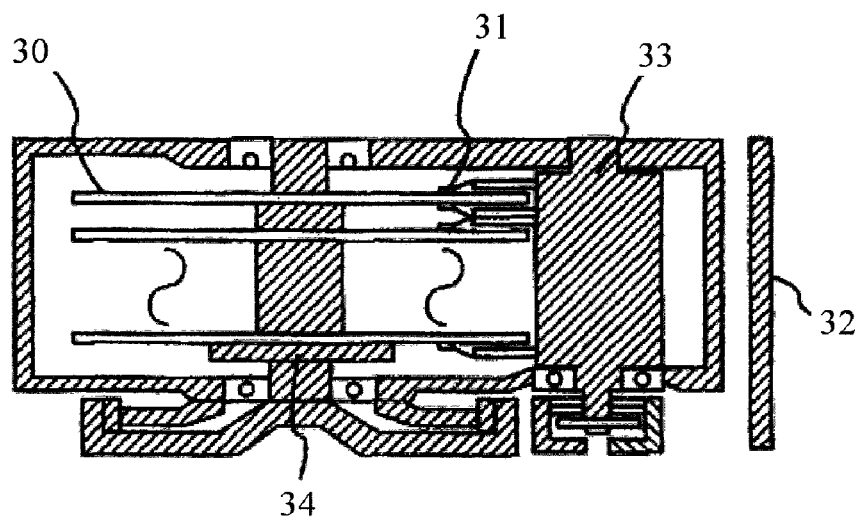
FIG. 6 is a cross-sectional view along line A-A' of FIG. 5.

FIG. 5 is a schematic structural view of a magnetic storage device in accordance with Embodiment 5 of the present invention. FIG. 6 is a cross-sectional view along line A-A' of FIG. 5.

Hereinafter, structures shown in FIGS. 5 and 6 will be described. The magnetic storage device in accordance with Embodiment 5 includes a patterned medium 30, a magnetic head 31, a read/write portion 32, a magnetic head driving portion 33, and a patterned medium driving portion 34.

The patterned medium 30 is formed using the magnetic recording medium 1 described in any of Embodiments 1 to 4. The patterned medium driving portion 34 rotates the patterned medium 30 in the recording direction.

The magnetic head 31 is a composite-type head including a write head with a trailing shield and a read head with a shield-type MR read element (e.g., a GMR film or a TMR film) Accordingly, information can be written to and read from the patterned medium 30.

The magnetic head driving portion 33 moves the magnetic head 31 relative to the patterned medium 30. The read/write portion 32 processes signals that are read from the patterned medium 30 with the magnetic head 31 and signals to be outputted to the patterned medium 30 with the magnetic head 31.

As described above, according to Embodiment 5, excellent corrosion resistance can be realized by mounting the magnetic recording medium 1 described in any of Embodiments 1 to 4 and the magnetic head 31 with a high magnetic field gradient.

EXAMPLES

Hereinafter, results of the corrosion resistance evaluation conducted under a variety of structural conditions will be described as an example of the present invention. The corrosion resistance was evaluated in the following procedures.
(1) Samples were left to stand still under high-temperature, high-humidity conditions (a temperature greater than or equal to 60° C. and a relative humidity RH greater than or equal to 90%) for 96 hours.

(2) The number of corrosion points in the radius range of 14 mm to 25 mm was counted using an optical surface analyzer, and the counts were ranked as follows. Practically, a rank of B or higher is desirable.
(2.1) Rank A: less than 50 counts
(2.2) Rank B: not less than 50 counts and less than 200 counts
(2.3) Rank C: not less than 200 counts and less than 500 counts
(2.4) Rank D: not less than 500 counts Example 1

In Example 1 of the present invention, the layer structure shown in FIG. 1 and Table 1 was used. For the protective film B25, carbon was used and it was deposited to a thickness of 2 nm. In addition, $SiO_2$ was used for the filler.

The disk shown in the state of FIG. 2H was immersed in an aqueous solution containing 1 wt % benzotriazole for 10 minutes so that a benzotriazole layer (the organic layer 19) was formed in the longitudinal position of the recess portion of the magnetic region 17 of the magnetic recording layer 16 as shown in FIG. 2I.

When the corrosion resistance and the medium S/N ratio of the structure shown in FIG. 2L (sample 1-1) were tested, the sample was found to exhibit a S/N ratio as high as 18 dB or greater and a corrosion resistance of rank A.

Example 2

In Example 2 of the present invention, samples were prepared in which heterocyclic compounds of different kinds were used for the organic layer 19 that is formed in the longitudinal position of the recess portion of the magnetic region 17 of the magnetic recording layer 16.

The concentration of the heterocyclic compound in an aqueous solution in which the disk was immersed is 1.0 wt %. Heterocyclic compounds that could not be completely dissolved in the aqueous solution were dissolved in an organic solvent such as ethanol in advance, and then were mixed with the aqueous solution.

Table 2 shows the composition of the organic layer 19 and the evaluation results of the corrosion resistance thereof in Example 2. Samples 2-10 and 2-11 are not heterocyclic compounds, but they are effective samples as compounds with an unpaired electron.

TABLE 2

| Sample | Heterocyclic Compounds for Forming Organic Layer 19 | Corrosion Resistance Rank |
| --- | --- | --- |
| 2-1 | Not Processed | D |
| 2-2 | benzotriazole | A |
| 2-3 | 1,2,3-triazole | A |
| 2-4 | nitro-1H-benzotriazole | A |
| 2-5 | 5-methylbenzotriazole | A |
| 2-6 | carboxybenzotriazole | A |
| 2-7 | uric acid | A |
| 2-8 | pterin | A |
| 2-9 | 5-phenyl-1,3,4-thiadiazole-2-triol | A |
| 2-10 | mercaptobenzothiazole | A |
| 2-11 | ethylenediamine | A |

All of the samples that formed the organic layer 19 exhibited excellent corrosion resistance. In addition, the medium S/N ratio was also excellent, being 18 dB or greater. As such samples were found to be excellent in corrosion resistance, it is clear that the adhesion between the organic layer 19 and CoCrPt—SiO$_2$ used for the magnetic recording layer 16 in Example 2 is also excellent.

Example 3

In Example 3 of the present invention, samples were prepared in which organic compounds for forming a self-assembled film were used for the organic layer 19 that is formed in the longitudinal position of the recess portion of the magnetic region 17 of the magnetic recording layer 16. Table 3 below shows the composition of each compound that forms the self-assembled film and the corrosion resistance rank thereof.

TABLE 3

| Sample | Self-Assembling Organic Compounds for Forming Organic Layer 19 | Corrosion Resistance Rank |
|---|---|---|
| 3-1 | 1-octadecanethiol | A |
| 3-2 | mercaptohexadecenoic acid | A |
| 3-3 | mono-n-dodecyl phosphate | A |
| 3-4 | mercaptopropyltrimethoxysilane | A |
| 3-5 | n-dodecanehydroxamic acid | A |

(Sample 3-1)
This is the sample of FIG. 2I prepared by immersing the sample of FIG. 2H in an ethanol solution containing 0.05 M (mol concentration, hereinafter the same shall apply) 1-octadecanethiol for five minutes.
(Sample 3-2)
This is the sample of FIG. 2I prepared by immersing the sample of FIG. 2H in a solution in which 0.03 M mercaptohexadecanoic acid was dissolved in an ethanol/water solution (ratio of 4:1) for one minute.
(Sample 3-3)
This is the sample of FIG. 2I prepared by immersing the sample of FIG. 2H in a solution in which mono-n-dodecyl phosphate was dissolved in an acetone/water solution (ratio of 1:1) for one minute so that the solution contains 1.0 wt % mono-n-dodecyl phosphate.
(Sample 3-4)
This is the sample of FIG. 2I prepared by immersing the sample of FIG. 2H in a solution in which mercaptohexadecanoic acid was dissolved in an ethanol/water solution (ratio of 1:1) for one minute so that the solution contains 2.0 wt % mercaptohexadecanoic acid.
(Sample 3-5)
This is the sample of FIG. 2I prepared by immersing the sample of FIG. 2H in a 0.5 mM ethanol solution for two hours.

When the corrosion resistance and the medium S/N ratio of the final structure of each sample fabricated with the method shown in Example 3 (the structure of the magnetic recording medium 1 shown in FIG. 2L) were tested, each sample was found to exhibit a S/N ratio as high as 18 dB or greater and a corrosion resistance of rank A as shown in Table 3.

Example 4

In Example 4 of the present invention, corrosion resistance when metals to be passivated were used in the step of FIG. 2H instead of carbon used for the protective film B25 in Example 1 was evaluated. Table 4 below shows exemplary compositions of metals to be passivated and the corrosion resistance ranks thereof.

When the corrosion resistance and the medium S/N ratio of the final structure (the structure of the magnetic recording medium 1 shown in FIG. 2L) were tested, each sample was found to exhibit a S/N ratio as high as 18 dB or greater and a corrosion resistance of rank A.

TABLE 4

| Sample | Metals to be Passivated | Corrosion Resistance Rank |
|---|---|---|
| 4-1 | $Ta_{70}Cr_{30}$ | A |
| 4-2 | $Cr_{70}Nb_{30}$ | A |
| 4-3 | $Cr_{50}Zr_{50}$ | A |
| 4-4 | $Cr_{50}Ti_{45}Nb_5$ | A |
| 4-5 | $Cr_{50}Ti_{50}$ | A |

Example 5

Example 5 of the present invention shows an example in which the magnetic recording medium 1 was fabricated with the fabrication method described in Embodiment 3. The evaluation result of the corrosion resistance of Example 5 was rank B. That is, in comparison with the case in which a carbon layer (the protective film B25) is formed at the bottom of the recess, portion of the magnetic region 17, the corrosion resistance was slightly lower.

This is considered to be attributable to defects due to damage caused by the processing of the recess portion of the magnetic recording layer 16, which has generated a path between part of the magnetic recording layer 16 and Ru in the underlying intermediate layer 15.

Example 6

Example 6 of the present invention shows an example in which the composition of the magnetic recording layer 16 was changed. The thickest portion of the magnetic recording layer 16 is 15 nm thick. The basic structures of the layers other than the magnetic recording layer 16 are the same as those of the sample 1-1 in Example 1. Table 5 below shows the composition and the corrosion resistance rank of the magnetic recording layer 16.

TABLE 5

| Sample | Composition of Magnetic Recording Layer | Corrosion Resistance Rank |
|---|---|---|
| 6-1 | CoCrPt—TaO | A |
| 6-2 | $[Co/Pd]_{20}$ | A |
| 6-3 | $[Co/Pt]_{20}$ | A |

$[Co/Pd]_{20}$ of the sample 6-2 in Table 5 refers to a stack of 20 layers formed by alternately stacking Co layers and Pd layers. This is also true for the description of the sample 6-3.

The sample 6-1 has a granular structure in which Ta oxide is added to CoCrPt. The magnetic recording layer 16 of each of the samples 6-2 and 6-3 is a multilayer film formed by alternately stacking Co and Pd layers or Co and Pt layers.

As shown in Table 5, the corrosion resistance rank does not change even when the composition of the magnetic recording layer 16 is changed. Thus, it is speculated that the adhesion between the magnetic recording layer 16 and the metals to be passivated is excellent.

Example 7

Example 7 of the present invention shows an example in which the magnetic recording medium 1 was fabricated with the fabrication method described in Embodiment 4. The material of the magnetic recording layer 16 and the thickness of each layer are the same as those of the sample 1-1 in Example 1. Then, the magnetic recording medium 1 in Example 7 was found to exhibit a S/N ratio as high as 18 dB or greater and excellent corrosion resistance of rank A.

Example 8

Comparative Example 1

This example is an example to be compared with each of the aforementioned examples. In Example 8, evaluation was conducted for a case in which a carbon layer was used for the protective film B25 and the organic layer 19 was not provided. As a result, the corrosion resistance rank was rank D, which indicates very poor corrosion resistance.

Example 9

Comparative Example 2

This example shows an example in which, instead of providing the organic layer 19 (heterocyclic compound) at the interface between the magnetic region 17 and the nonmagnetic region 18 shown in FIG. 1, the interface was processed with another surface treatment. Other than that, the basic composition and the thickness of each layer are the same as those in Example 1. In any case, the magnetic recording layer 16 has disappeared as shown in Table 6 below, with the result that disks could not be formed.

TABLE 6

| Sample | Surface Treatment for Magnetic Region | Corrosion Resistance Rank |
| --- | --- | --- |
| 9-1 | chromic acid (chromating) | N.G. |
| 9-2 | chromium chloride (trivalent chromate) | N.G. |
| 9-3 | zirconium phosphate treatment | N.G. |
| 9-4 | zinc phosphate treatment | N.G. |

It should be noted that the method for forming each layer, the apparatus used, and the like that have been described in the aforementioned embodiments and examples are only illustrative. Thus, it is needless to mention that when steps similar to those described above can be executed using other methods, apparatuses, and the like, advantageous effects that are about equal to those of the present invention can be achieved.

What is claimed is:

1. A magnetic recording medium comprising:
a magnetic recording layer including a magnetic region formed in a projection portion of a projection/recess pattern over a substrate, and a filler region embedded in a recess portion of the projection/recess pattern, and
a layer made of an organic compound interposed between the magnetic region and the filler region and chemically bonded to the magnetic region, the organic compound exhibiting corrosion inhibition action for cobalt or cobalt alloys, wherein a top of the magnetic region and a to of a filler region are formed in the same plane, so that side walls of the magnetic region are covered with the filler in their entirety,
wherein the organic compound that exhibits corrosion inhibition action is a heterocyclic compound.

2. The magnetic recording medium according to claim 1, wherein the layer made of an organic compound is formed along an entire interface between the magnetic region and the filler region.

3. The magnetic recording medium according to claim 1, wherein the layer made of an organic compound is formed at an interface between the magnetic region and the filler region.

4. The magnetic recording medium according to claim 1, wherein the magnetic region is in contact with or binds to the filler region with the layer made of an organic compound interposed therebetween.

5. The magnetic recording medium according to claim 1, further comprising at least one of a layer of metal to be passivated, a layer of an alloy containing at least one kind of metal to be passivated, and a carbon layer, the layer being formed at a bottom of the recess portion of the filler region.

6. The magnetic recording medium according to claim 1, wherein the organic compound that exhibits corrosion inhibition action is a compound that forms a self-assembled film.

7. The magnetic recording medium according to claim 5, wherein the metal to be passivated or the alloy containing at least one kind of metal to be passivated includes one element selected from the group consisting of Cr, Ti, Ta, Zr, Nb, Al, Si, and Ni.

8. The magnetic recording medium according to claim 1, further comprising a protective film formed on the magnetic recording layer.

9. The magnetic recording medium according to claim 1, wherein a soft magnetic underlayer, an intermediate layer, and the magnetic recording layer are sequentially stacked over the substrate.

10. A magnetic storage device comprising:
a magnetic recording medium; and
a magnetic head adapted to record information on or read information from the magnetic recording medium,
wherein the magnetic recording medium includes:
a magnetic recording layer that includes a magnetic region formed in a projection portion of a projection/recess pattern over a substrate, and a filler region embedded in a recess portion of the projection/recess pattern; and
a layer made of an organic compound interposed between the magnetic region and the filler region and chemically bonded to the magnetic region, the organic compound exhibiting corrosion inhibition action for cobalt or cobalt alloys,
wherein a top of the magnetic region and a top of a filler region are formed in the same plane, so that side walls of the magnetic region are covered with the filler in their entirety,
wherein the organic compound that exhibits corrosion inhibition action is a heterocyclic compound.

* * * * *